Aug. 12, 1941.   J. L. HIPPLE   2,252,374
LISTER PLANTER
Filed Sept. 7, 1940   3 Sheets-Sheet 3
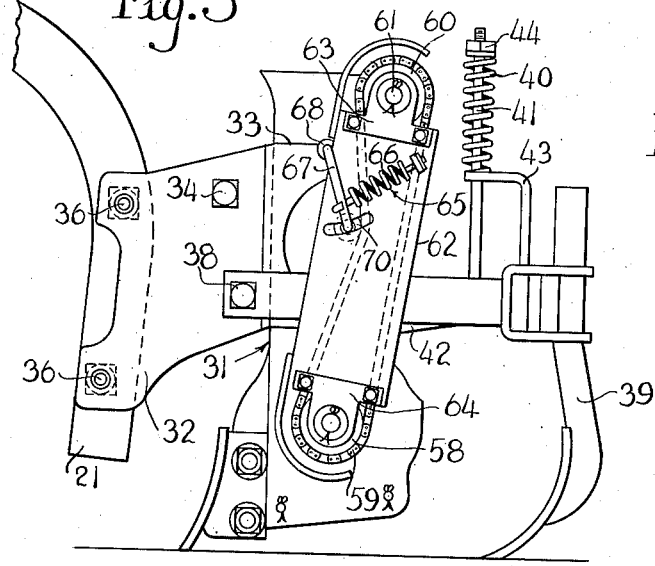
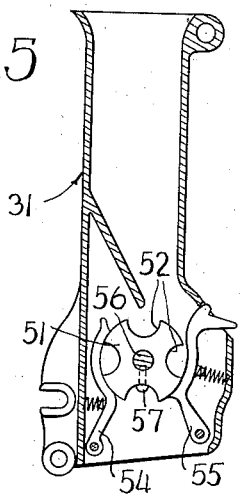
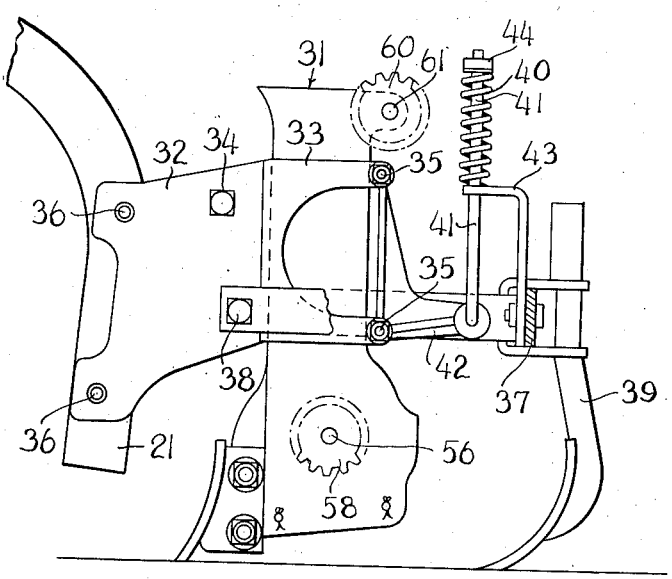
Inventor
James L. Hipple

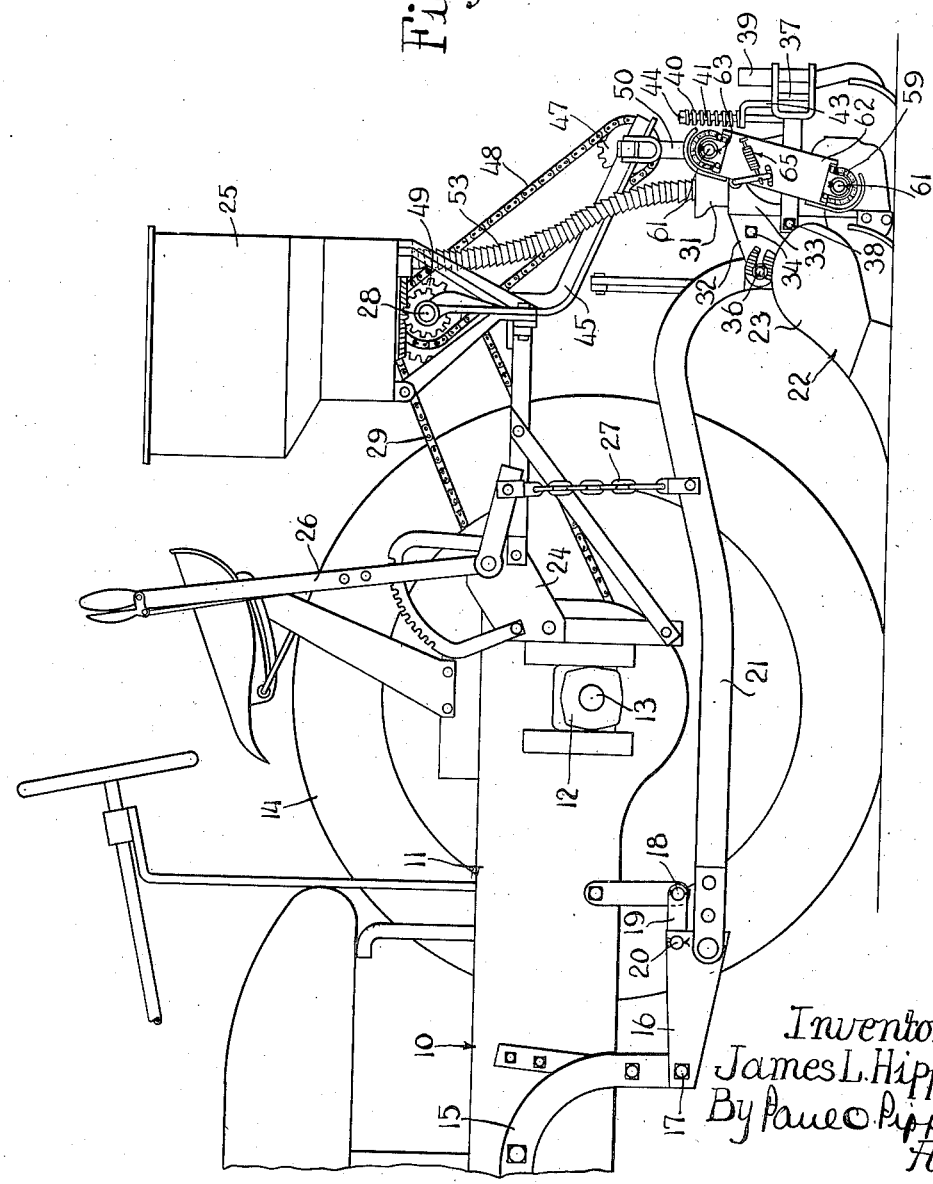

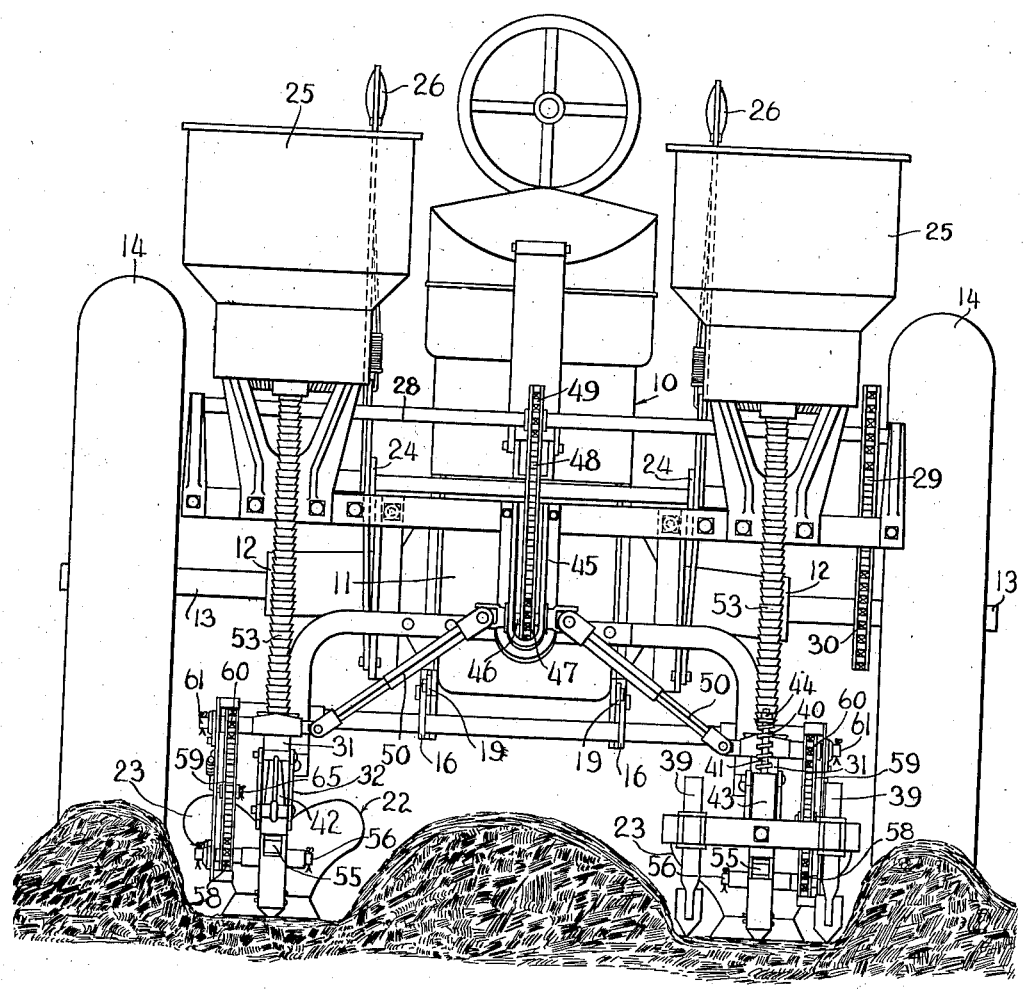

UNITED STATES PATENT OFFICE 2,252,374

LISTER PLANTER

James L. Hipple, Canton, Ill., assignor to International Harvester Company, a corporation of New Jersey Application September 7, 1940, Serial No. 355,799

13 Claims. (Cl. 111—59)

This invention relates to lister planters, and more particularly to a hill drop attachment therefor to make possible the planting of seeds in hills within a deep lister furrow.

Heretofore, hill drop attachments have been built to work behind planters carrying low sweeps where the furrow thereof upon completion is not of great depth. Where such sweeps are used, it has been possible to run cross-shafts from the rotary seed dispenser drive mechanism direct to the seed valve located in the seed boot near to the bottom of the furrow. These shafts have been connected to the seed valve directly and since the low sweeps do not particularly form a deep furrow, no great interference was encountered from the dirt thrown from these sweeps. Such an arrangement as used heretofore is shown and described in the Patent 2,140,622, issued December 20, 1938 to W. S. Graham. Where regular lister bottoms are used, and it is desired to plant in hills within a deep furrow, dirt coming off the moldboards makes it impossible to run the shaft directly from the seed cup valve in the seed boot.

It is, therefore, an object of the present invention to provide a hill drop attachment particularly adapted for use with lister plow bottoms which form deep furrows whereby power for the operation of the seed cup valve may still be provided from cross-shafts leading directly to the seed boot.

It is another object of the invention to provide such an attachment which may be carried directly by the seed boot located behind the lister plow bottom wherein power may be transmitted vertically to the seed valve located within the seed boot at its end furthermost within the furrow, whereby there will be no interference with the drive mechanism therefor from dirt moving off the moldboard when the planter is in operation.

According to the present invention, there has been provided an auxiliary transmission means comprising a flexible drive connected between the seed valve shaft which extends laterally from the seed boot and a second or an auxiliary drive shaft vertically removed from the seed valve shaft, and carried by the upper end of the seed boot. This auxiliary shaft will thereby serve to receive power from the cross-shaft adapted to be driven by means associated with the tractor. Surrounding the transmission drive between the seed valve shaft and the auxiliary shaft is means for enclosing the drive to protect the same from any obstructions with which it may encounter during movement of the same over the field being planted. This hill drop drive means may be fully carried by the seed boot which is fixed to the rear of the lister plow beam and can be removed with the seed boot upon the same being disassembled from the plow beam.

For a better understanding of the invention, reference may be had to the detailed description taken in connection with the accompanying drawings, in which:

Figure 1 is a side elevational view of the rear portion of a tractor with a lister planting attachment connected thereto and this planting attachment embodying the hill drop drive means forming the present invention;

Figure 2 is a rear view in elevation of the tractor and of the planter attachment showing the disposition of the seed dispensing units above the seed boot and of the drive mechanism connected to the seed boot in rear of the plow bottoms;

Figure 3 is a detail view in elevation of the hill drop drive mechanism forming the feature of the present invention;

Figure 4 is also a detail view in elevation showing the location of the seed valve shaft and the auxiliary shaft with chain drive removed, the chain drive being removed from the same; and Figure 5 is a view in cross-section of the seed boot and seed valve.

Referring now particularly to Figures 1 and 2, there is shown a tractor or motor propelled wheeled frame 10 having a transmission and differential housing 11 from which there extends laterally the rear axle housings 12 surrounding a rear axle drive shaft 13 for driving the rear tractor wheels 14. Connected forwardly of the rear axle housing 12 is a depending bracket structure 15 carrying at its lower end a drag frame 16 adapted for pivotal movement about its connection 17 therewith. This drag frame 16 may be pivoted about its connection 17 by means of a rotatable shaft 18 having an arm 19 connected with the drag frame at 20. To this drag frame may be connected a plurality of lister plow beams 21 having respectively lister plow bottoms or furrow openers 22 with the moldboard portions 23. These plow beams 21 extend rearwardly underneath the rear axle housing of the tractor to a location in rear of the tractor.

On the rear axle housings 12 is a bracket structure 24 for supporting the seed dispensing units 25. These seed dispensing units are so located that they will be disposed immediately above the lister plow bottoms 22, respectively.

This bracket structure 24 may also support a manual adjusting mechanism 26 connected by means of a chain 27 with the plow beams whereby the plowing depth of the bottoms may be regulated and as well may be lifted out of their plowing operation for the purpose of being transported.

Also supported on the bracket structure 24 is a drive shaft 28 extending laterally with respect thereon for the purpose of driving the seed dispensing units 25. This drive shaft 28 may be driven by a chain connection 29 with a sprocket 30 on the tractor axle 13. While this means is shown for driving the shaft 28, it shall be understood that any means whereby power may be taken from the tractor power plant may be used.

Connected to the rear end of the plow beams 21 are respectively seed boots 31. The means for so connecting the seed boots 31 to the beam 21 may take the form of a bracket structure 32 having a bifurcated portion 33 adapted to surround the seed boot 31 and to be clamped thereto by means of bolts 34 and 35, see Figures 3 and 4. The supporting structure 32 for the seed boot 31 may in turn be connected to the tool beam 21 by means of bolts 36. Immediately in rear of the seed boot and pivoted to the supporting structure 32 by means of a rearwardly extending frame 37 and pivoted as at 38, are the covering shovels 39 serving to cover the seed in the bottom after they have been deposited in the bottom of the furrow. These tools 39 may be held in spring pressed relation with respect to the supporting structure 32 by means of a pressure spring 40 carried by a rod 41 which is connected at its bottom end to a bracket structure 42 which is in turn made rigid with the supporting structure 32 by means of the clamping bolts 35. The spring 40 rests on a vertical extension 43 of the covering tool supporting frame 37. To the upper end of the rod 41 is a stop element 44 against which the spring 40 may react.

The bracket structure 24 also carries a depending supporting structure 45 adapted to carry a shaft 46 having a chain sprocket 47. To this chain sprocket 47 there is connected a chain drive 48 adapted to receive power from a sprocket 49 on the transversely extending drive shaft 28. It will be noted from Figure 2 that this supporting structure for the drive means is located centrally with relation to the lister plow beams. From the shaft 46 there may be connected the telescoping cross shafts 50 which extend laterally to supply power to valve means forming a part of the seed boot.

Referring now to Figure 5, it will be noted that the seed boot 31 has a seed cup valve 51 located within its bottom end. This seed cup valve 51 has a series of cup portions or pockets 52 adapted to receive a group of seeds as they are communicated with the upper end of the seed boot from the seed dispensing units 25 by means of a communication tube 53. To totally enclose the lower end of the seed boot, there is provided spring biasing elements 54 and 55. These elements bear against the seed valve 51 and prevent thereby any leakage of seed from the seed boot other than that which is received in the cup or pocket portion 52. Should there be any jamming of the seed, these elements 54 and 55 may be depressed to relieve it of this situation. The seed valve 51 is adapted to be driven by a shaft 56 to which it is rigidly fixed by means of a locking screw 57. The shaft 56 extends laterally through the seed boot and has at one end thereof a sprocket 58. It will be noted that this shaft is so located with respect to the plow bottom that it is immediately in rear of the moldboards 23 so that it would be out of the path of dirt coming off these moldboards.

Extending vertically from the sprocket 58 is a flexible transmission drive means or chain 59. This chain extends vertically to a location substantially removed from the lister furrow for connection with a sprocket 60 carried by a second or auxiliary shaft 61. This shaft 61 is journaled on the upper end of the seed boot 31 and extends inwardly for connection with the cross-shaft 50. Operation of the drive mechanism and of the cross-shaft 50 will thereby serve to operate the seed valve 51 within the seed boot.

It should thus now be apparent that there has been provided a means for driving a seed valve located deep within a lister furrow whereby the same will not be interfered with by dirt coming off the moldboards of the lister plow bottoms. By such means the shaft 50 may be located well above the seed valve whereby its movement as the tractor traverses over the field will not be interfered with by obstructions projecting from the ground.

As a means for protecting the chain drive 59 against obstructions on the ground and at the same time to keep stray dirt and trash from getting into the chain, there has been provided enclosure means 62 having at its upper end a bracket 63 and at its lower end a bracket 64. These brackets may fit over the shafts 56 and 61 for the purpose of retaining the enclosure means in its position about the chain 59. The enclosure means 62 may also serve as a support for a chain tightening device 65 including a spring 66 and a lever 67 pivoted at 68 and having a roller 70 adapted to bear against the chain 59.

It should now be apparent that the usual cross-shafts ordinarily utilized for the driving of low sweeps may now be used for the driving of seed valves associated with lister plow bottoms, thereby making it possible to plant seed in hills along the bottoms of deep furrows.

While various changes may be made in the detail construction of the device embodying the present invention, it shall be understood that such changes shall be within the spirit and scope of the present invention as defined by the appended claims.

What is claimed is:

1. In a lister planter, a frame, a lister plow bottom of a type adapted to prepare deep furrows, a plow beam for connecting the lister plow bottom to the frame, a hill drop attachment adapted to be connected to the plow beam including a seed boot having a seed valve in its end located furthermost within the furrow and adapted to be driven, driving means for the seed valve carried by the seed boot and extending vertically to a location substantially removed from the bottom of the furrow, and means for driving said seed valve driving means.

2. In a lister planter, a frame, a lister plow bottom of a type adapted to prepare deep furrows, a plow beam for connecting the lister plow bottom to the frame, a hill drop attachment adapted to be connected to the plow beam including a seed boot having a seed valve in its end located furthermost within the furrow and adapted to be driven, driving means for the seed valve carried by the seed boot and extending vertically to a location substantially removed from the bottom of the furrow, and means for driving said seed valve driving means, and means carried by the seed boot for enclosing the seed valve driving means.

3. In combination, a frame, a lister plow bottom of a type adapted to prepare deep furrows, a plow beam for connecting the lister plow bottom to the frame, a seed dispenser carried on the frame above the plow bottom, a seed boot carried by the plow beam in rear of the plow bottom and having a rotary cup valve located in the bottom thereof, drive shaft means for the rotary cup valve extending laterally from the seed boot, a second shaft carried by the seed boot vertically removed from the rotary cup valve drive shaft and parallel therewith, flexible transmission means extending between the two shafts, a seed tube extending between the seed dispenser and the seed boot, and means for driving the seed dispenser and said vertically removed second shaft.

4. In a lister planter, a frame, a lister plow bottom of a type adapted to prepare deep furrows, a plow beam for connecting the lister plow bottom to the frame, a hill drop attachment adapted to be connected to the beam and including a seed boot having a seed valve in its end located furthermost within the furrow, shaft means for rotating said seed valve extending laterally from the seed boot, a second shaft carried by the seed boot vertically removed from the seed valve shaft means and extending substantially parallel therewith, flexible transmission means extending between the two shafts, and means for driving said second shaft.

5. In a lister planter, a frame, a lister plow bottom of a type adapted to prepare deep furrows, a plow beam for connecting the lister plow bottom to the frame, a hill drop attachment adapted to be connected to the beam and including a seed boot having a seed valve in its end located furthermost within the furrow, shaft means for rotating said seed valve extending laterally from the seed boot, a second shaft carried by the seed boot vertically removed from the seed valve shaft means and extending substantially parallel therewith, flexible transmission means extending between the two shafts, and means for driving said second shaft, means carried by the seed boot for enclosing the flexible transmission means.

6. In combination, a tractor, a lister planter attachment adapted to be carried by the tractor including a lister plow bottom of a type adapted to prepare deep furrows, a plow beam for carrying the plow bottom, and a hill drop attachment adapted to be connected to the plow beam including a seed boot having a seed valve in its end located furthermost within the furrow and adapted to be driven, driving means for the seed valve carried by the seed boot and extending vertically to a location substantially removed from the bottom of the furrow, and means associated with the tractor for driving the seed valve driving means.

7. In combination, a tractor, a lister plow bottom of a type adapted to prepare deep furrows, a plow beam for connecting the lister plow bottom to the tractor for movement to and from its working position, a seed dispenser carried on the tractor above the lister plow bottom, a seed boot carried by the plow beam in rear of the plow bottom and having a rotary seed cup valve located in the bottom thereof, drive shaft means for the cup valve extending laterally from the rotary seed boot, a second shaft carried by the seed boot vertically removed from the rotary cup valve drive shaft and parallel therewith, flexible transmission means extending between the rotary cup valve drive shaft and the second shaft, a seed tube extending between the seed dispenser and the seed boot, and means adapted to receive power from the tractor for driving the seed dispenser and said vertically removed second shaft.

8. In combination, a frame, a lister plow bottom of a type adapted to prepare deep furrows, a plow beam for connecting the lister plow bottom to the frame, a seed planting attachment including a seed dispenser and a seed boot in communication therewith, said seed boot being carried by the plow beam and having a seed valve therein in its end located furthermost within the furrow, means for driving the seed valve including a cross-shaft adapted to be driven by means associated with the frame, means located near the upper end of the seed boot and free dirt forming the furrow for receiving power from the cross-shaft, and transmission means extending downwardly from the receiving means and in rear of the lister bottom for driving said seed valve.

9. In combination, a tractor, a lister planter attachment adapted for connection with the tractor including a lister plow bottom of a type adapted to prepare deep furrows, a plow beam carrying the plow bottom, a seed planting attachment including a seed dispenser and a seed boot in communication therewith, said seed boot being carried by the plow bottom and having a seed valve therein in its end located furthermost within the furrow, means adapted to be driven by the tractor for driving the seed valve including a cross-shaft vertically removed from the seed valve to be free of the dirt forming the furrow, and transmission means extending downwardly from the cross-shaft and in rear of the lister bottom for driving said seed valve.

10. In a lister planter, a frame, a lister plow bottom of a type adapted to prepare deep furrows, a plow beam for connecting the lister plow bottom to the frame, a hill drop attachment adapted to be connected to the plow beam including a seed boot having a seed valve in its end located furthermost within the furrow and adapted to be driven, driving means for the seed valve including a drive shaft vertically removed from the seed valve and from the bottom of the furrow, and means for driving said seed valve driving means.

11. In a planter, a frame, a furrow opener, means for connecting the furrow opener to the frame, a hill drop attachment adapted to be connected to the connecting means including a seed boot having a seed valve, driving means for the seed valve connected to the seed boot and extending vertically to a location thereabove, and means for driving said seed valve driving means vertically removed from the seed valve.

12. In combination, a tractor, a planting attachment adapted to be connected to the tractor including a furrow opener, beam structure for carrying the furrow opener, and a hill drop attachment adapted to be connected to the beam structure including a seed boot having a seed valve in its lower end adapted to be driven, driving means for the seed valve carried by the seed boot and extending vertically to a location substantially removed from the seed valve, and means associated with the tractor for driving the seed valve driving means.

13. In a planter, a frame, a furrow opener, beam structure for connecting the furrow opener to the frame, a hill drop attachment adapted to be connected to the beam structure including a seed boot having a seed valve in its lower end and adapted to be driven, driving means for the seed valve including a drive shaft vertically removed from the seed valve, and means for driving said drive shaft.

JAMES L. HIPPLE.